Patented May 16, 1944

2,349,179

UNITED STATES PATENT OFFICE 2,349,179

PRODUCTION OF NITROGENOUS HETEROCYCLIC COMPOUNDS

Karl Kumetat, Wolfen, Kreis Bitterfeld, and Oskar Riester, Dessau-Haideburg, Germany; vested in the Alien Property Custodian No Drawing. Application February 17, 1942, Serial No. 431,264. In Germany August 9, 1940

10 Claims. (Cl. 260—240)

Our present invention relates to nitrogenous heterocyclic compounds and more particularly to the production of intermediate products for the preparation of dyestuffs especially cyanine dyestuffs.

We have found that salts of nitrogenous heterocyclic compounds which carry an ω-alkyl-mercaptoethene group in the α- or γ-position and have the following general formula:

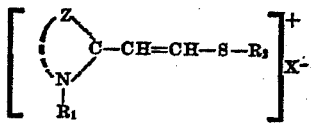

wherein Z stands for a group of molecules necessary to complete a 5- or 6-membered ring usual in cyanine dye art as, for instance, indoline, oxazole, thiazole, selenazole, oxazoline, thiazoline, selenazoline, pyridine, lepidine, imidazole, quinoline or thiodiazole; these heterocyclic radicals may carry substituents such as alkyl, aryl, benzyl, phenylene, naphthylene and substituted phenyls or heterocyclic radicals or may be condensed with aromatic or heterocyclic rings; $R_1$, $R_2$ stand for alkyl or aralkyl, and X stands for an anionic acid radical as, for instance, Cl, Br, I, $ClO_4$, $SO_4$, $SO_3CH_3$, $SO_3C_2H_5$, $SO_3C_6H_4.CH_3$, are obtained by reacting heterocyclic 2 (or 4) -methene-ω-aldehydes of the formula:

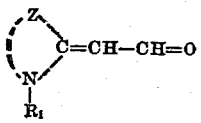

wherein Z and $R_1$ mean the same radicals as mentioned above, in a solvent with phosphorus pentasulfide and treating the thus resulting thioaldehyde with alkylhalides or reactive alkyl esters. The heterocyclic 2-methene-ω-aldehyde may be prepared by the process disclosed in U. S. application Ser. No. 176,063, filed November 23, 1937. In the treatment with phosphorus pentasulfide aromatic hydrocarbons in which the ω-aldehydes are soluble as, for instance, benzene, toluene, or xylene may be used as solvents. The phosphorus pentasulfide is used in such an amount that at least 1 mol thereof is applied to 1 mol of aldehyde. The thioaldehyde is obtained by concentrating the reaction liquid or precipitating, for instance, with benzene of methylisoheptane. The thioaldehyde is condensed with alkylhalides or reactive alkyl esters. This reaction may be accomplished by reacting the alkylating agents and the thioaldehyde, if necessary in the presence of a solvent as, for instance, methanol or benzene. As alkylating agents alkylbromide, alkyliodide, alkylsulfate or alkyltoluenesulfonate are, for instance, suited.

The compounds prepared by the process of the present invention are valuable intermediate products in the preparation of dyestuffs especially cyanine dyestuffs. They readily react with active methylene or methyl groups with the formation of merocyanines or polymethine dyestuffs. The dyestuffs derived from these intermediate products are obtained in a purer form and with a better yield than they are by processes hitherto known. Owing to the reactivity of the intermediate product it is also possible to cause such compounds containing methylene or methyl groups to react as have not hitherto been capable of forming dyestuffs.

The more detailed practice of the invention is illustrated by the following examples. There are, of course, many forms of the invention other than these specific embodiments.

Example 1

300 g. of 1.1.3-trimethylindoline-2-methene-ω-aldehyde are dissolved in 2 liters of benzene. To the mixture 450 g. of phosphorus pentasulfide are added. The whole is boiled for two hours and filtered. The filtrate is clarified with charcoal, concentrated and precipitated with benzine. Melting point 110–111° C.

21 g. of the thioaldehyde thus prepared are dissolved in 100 cc. of methanol and mixed with 30 cc. of dimethylsulfate at 50° C. After cooling 100 cc. of an aqueous sodium perchlorate solution of 20% strength is added thereto. 28 g. of a compound of the following formula with a melting point of 225° C. crystallize out:

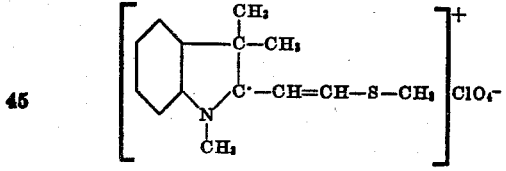

Example 2

1.1.3.6-tetramethylindoline-2-methene-ω-aldehyde is reacted with phosphorus pentasulfide in the manner as described in Example 1. If the thioaldehyde thus obtained and having a melting point of 199–201° C. with decomposition is treated with dimethylsulfate, a reaction product having a melting point of 191° C. and the following formula is produced.

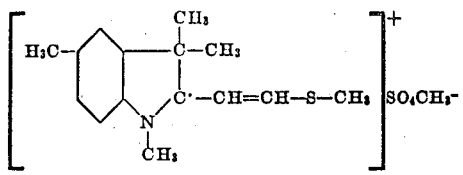

Example 3

1.1.3-trimethyl-6-methoxyindoline-2-methene-ω-aldehyde is treated in the manner as described in Example 1. The thioaldehyde obtained melts at 170–172° C. The dimethyl sulfate addition product is treated in the manner as described in Example 1. It then melts at 225° C. with decomposition and has the following constitution:

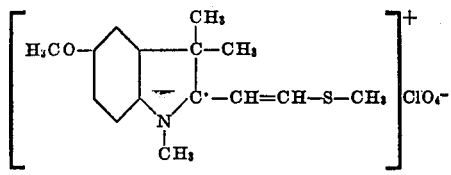

Example 4

3 - ethyl - benzselenazoline-2-methene-ω-aldehyde is reacted with phosphorus pentasulfide in the manner as described in Example 1. The oily reaction product is treated with dimethylsulfate and precipitated with sodium perchlorate. The resulting product melts at 200° C. and has the following constitution:

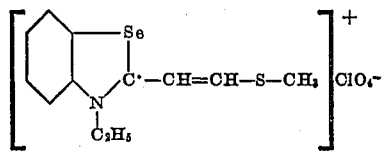

Example 5

3 - ethyl-benzthiazoline-2-methene-ω-aldehyde is transformed into the thioaldehyde in the manner as described in Example 1. The reaction product is treated with dimethylsulfate and precipitated with sodium perchlorate. The resulting product melts at 178° C. and has the following formula:

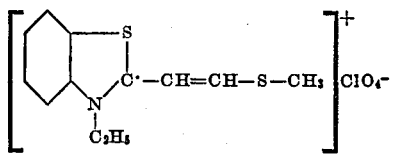

Example 6

3-ethyl-thiazolidine-2-methene-ω-aldehyde is treated with phosphorus pentasulfide in the manner as described in Example 1. The oily reaction product thus obtained is condensed with dimethylsulfate. On precipitating with sodium perchlorate a compound having a melting point of 99° C. and the following formula is produced.

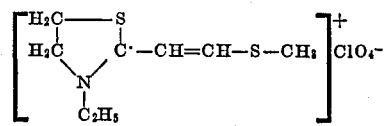

Example 7

$\tfrac{1}{10}$ mol of the thioaldehyde obtained in the manner as described in Example 1 is dissolved in 150 cc. benzene and mixed with $\tfrac{1}{10}$ mol of dimethylsulfate. After some time an addition compound having a decomposition point of 143–145° C. and the following formula crystallizes out.

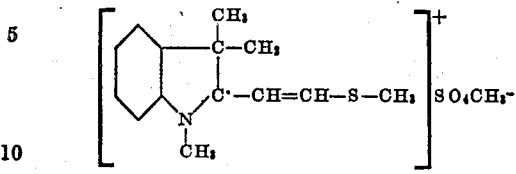

Example 8

The addition compound of Example 7 is dissolved in water and mixed with an excess of an aqueous potassium iodide solution of 20% strength. A compound having a decomposition point of 226–227° and the following constitution crystallizes out:

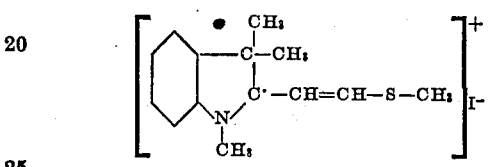

Example 9

The addition compound of Example 7 is dissolved in water and mixed with an aqueous ammoniumthiocyanate solution of 20% strength. A compound with a decomposition point of 193–196° C. and having the following formula crystallizes out:

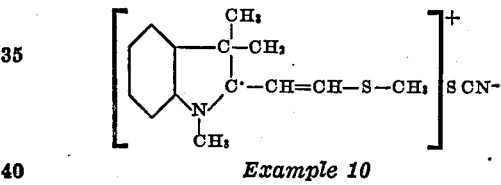

Example 10

1.1.3 - trimethylindoline-2-methene-ω-aldehyde is transformed into a thioaldehyde in the manner as described in Example 1. 21 g. of the thioaldehyde are dissolved in 80 cc. of methanol heated to 50° C. 35 cc. of diethylsulfate are then added to the solution whereupon the mixture is kept at 50° C. for 5 minutes. After cooling to 0° C. 100 cc. of a sodium perchlorate solution of 20% strength is added thereto. A compound of the following constitution crystallizes out:

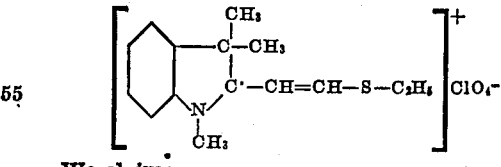

We claim:

1. A process for producing salts of nitrogenous heterocyclic compounds substituted by an ω-alkylmercaptoethane group in a position selected from the group consisting of α- and γ-positions which process comprises reacting a heterocyclic methene-ω-aldehyde selected from the class consisting of 2-methene-ω-aldehyde and -4-methene-ω-aldehyde of the following general formula:

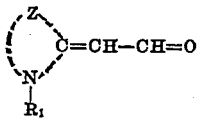

wherein Z means a group of molecules necessary to complete a ring usual in cyanine dye art, said ring being selected from the class consisting of 5- and 6-membered rings, and R₁ means an alkyl, in a solvent with phosphorus pentasulfide and treating the thus resulting product with a compound selected from the class consisting of alkyl halides and alkyl esters.

2. A compound of the following formula:

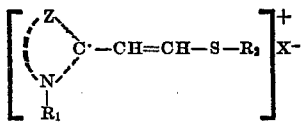

wherein Z means a group of molecules necessary to complete a ring usual in cyanine dye art, said ring being selected from the class consisting of 5- and 6-membered rings, R₁, R₂ mean an alkyl, and X means an anionic acid radical.

3. A dyestuff of the following formula:

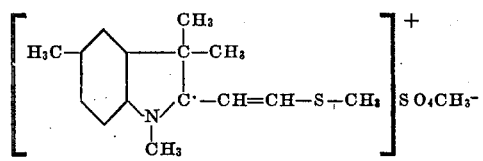

4. A dyestuff of the following formula:

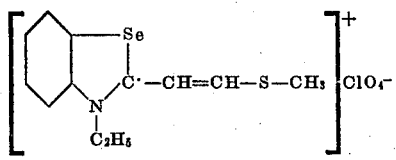

5. A dyestuff of the following formula:

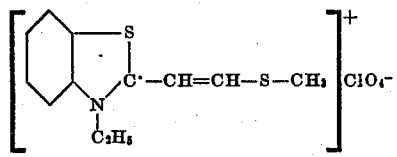

6. A process for producing salts of nitrogenous heterocyclic compounds substituted by an ω-alkylmercaptoethene group in a position selected from the group consisting of α-γ-positions which process comprises reacting one mol of a heterocyclic methene-ω-aldehyde selected from the class consisting of 2-methene-ω-aldehyde and 4-methene-ω-aldehyde of the following general formula:

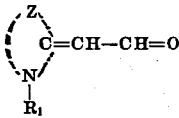

wherein Z means a group of molecules necessary to complete a ring usual in the cyanine dye art, said ring being selected from the class consisting of 5- and 6-membered rings, and R₁ means an alkyl group, in a solvent with at least one mol on phosphorus pentasulfide and treating the resulting product with a compound selected from the class consisting of alkylhalides and alkylesters.

7. A process for producing salts of nitrogenous heterocyclic compounds substituted by an ω-alkylmercaptomethene group in a position selected from the group consisting of α- and γ-positions which process comprises reacting a heterocyclic methene-ω-aldehyde selected from the class consisting of 2-methene-ω-aldehyde and 4-methene-ω-aldehyde with the following general formula:

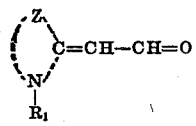

wherein Z means a group of molecules necessary to complete a ring usual in the cyanine dye art, said ring being selected from the class consisting of 5- and 6-membered rings, and R₁ means an alkyl group, in a solvent with phosphorus pentasulfide and treating the resulting product with a compound selected from the class consisting of alkylhalides and alkyl esters in the presence of a solvent selected from the group consisting of methanol and benzene.

8. A process for producing the nitrogenous heterocyclic compound of the general formula:

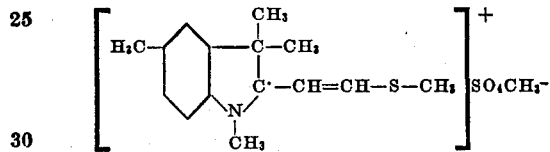

which comprises reacting 1-1-3-6-tetramethyl-indoline-2-methene-ω-aldehyde with phosphorus pentasulfide and treating the resulting product with dimethyl sulfate.

9. A process for producing the nitrogenous heterocyclic compound of the general formula:

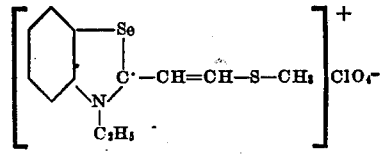

which comprises reacting 3-ethyl-benzselenazoline - 2 - methene - ω - aldehyde with phosphorus pentasulfide, treating the reaction product with dimethylsulfate and precipitating the resulting product with sodium perchlorate.

10. A process for producing the nitrogenous heterocyclic compound of the general formula:

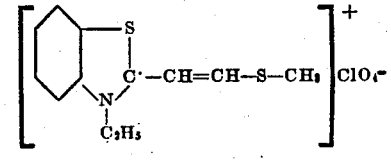

which comprises reacting 3-ethyl-benzthiazoline-2-methene-ω-aldehyde with phosphorus pentasulfide, treating the reaction product with dimethylsulfate, and precipitating the resulting product with sodium perchlorate.

KARL KUMETAT.
OSKAR RIESTER.